United States Patent
Nagatsuma et al.

(10) Patent No.: US 6,532,432 B1
(45) Date of Patent: Mar. 11, 2003

(54) PORTABLE GPS VELOSITY/DISTANCE METER

(75) Inventors: Hideaki Nagatsuma, Chiba (JP); Kazumi Sakumoto, Chiba (JP); Hiroshi Odagiri, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/421,594

(22) Filed: Oct. 20, 1999

(30) Foreign Application Priority Data

Oct. 22, 1998 (JP) .......................................... 10-300944
Sep. 22, 1999 (JP) .......................................... 11-269194

(51) Int. Cl.$^7$ ............................................... G01S 5/02
(52) U.S. Cl. ..................... 702/149; 702/94; 702/142; 702/149; 702/150; 702/178; 702/188
(58) Field of Search ............................. 702/92–95, 142, 702/143, 149, 150, 152, 178, 183, 187, 188, FOR 123, FOR 124, FOR 134, FOR 135, FOR 143, FOR 144, FOR 150, FOR 151, FOR 154, FOR 170; 73/488, 178 R; 701/1, 207, 208, 213; 340/988, 990, 995, 825.34; 342/357, 352; 482/8

(56) References Cited

U.S. PATENT DOCUMENTS

| | | | | |
|---|---|---|---|---|
| 5,579,014 A | * | 11/1996 | Brooksby et al. ............ | 342/357 |
| 5,790,477 A | * | 8/1998 | Hauke ...................... | 368/10.11 |
| 5,887,269 A | * | 3/1999 | Brunts et al. ............... | 701/208 |
| 5,905,460 A | * | 5/1999 | Odagiri et al. .............. | 342/357 |
| 6,091,785 A | * | 7/2000 | Lennen ....................... | 375/316 |
| 6,104,978 A | * | 8/2000 | Harrison et al. ............ | 701/207 |
| 6,198,431 B1 | * | 3/2001 | Gibson .................. | 342/357.07 |
| 6,246,959 B1 | * | 6/2001 | Nakajima ................... | 701/213 |
| 6,285,314 B1 | * | 9/2001 | Nagatsuma et al. ... | 342/357.08 |

FOREIGN PATENT DOCUMENTS

| | | | | |
|---|---|---|---|---|
| JP | 11166827 A | * | 6/1999 |
| JP | 2000180197 A | * | 6/2000 |
| JP | 2000193482 A | * | 7/2000 |
| JP | 2000284041 A | * | 10/2000 |
| JP | 2000292199 A | * | 10/2000 |
| JP | 2000304842 A | * | 11/2000 |
| JP | 2000321090 A | * | 11/2000 |
| JP | 2001051079 A | * | 2/2001 |
| JP | 2001074494 A | * | 3/2001 |
| JP | 2001109541 | * | 4/2001 |
| JP | 2001159671 A | * | 6/2001 |
| JP | 2001174533 A | * | 6/2001 |

* cited by examiner

Primary Examiner—Marc S. Hoff
Assistant Examiner—Carol S. Tsai
(74) Attorney, Agent, or Firm—Adams & Wilks

(57) ABSTRACT

To provide a portable GPS velocity/distance meter which may seek a suitable movement velocity by removing an affect of arm swing, save power consumption of a device, and to grip a movement condition of a carrier at a remote position, it is composed of a GPS signal receiving portion for measuring the movement velocity from a Doppler frequency, a microcomputer, an input section for setting a control condition or the like and calculation of various data including positional interval data of the GPS signal receiving section, a display section for displaying the movement velocity or the like and a transmit-receive section. Then, the microcomputer is provided with a control unit for controlling the GPS signal receiving section to intermittently perform the positional operation on the basis of the positional measurement interval and a velocity averaging unit for averaging the movement velocity.

20 Claims, 6 Drawing Sheets

PORTABLE GPS VELOSITY/DISTANCE METER

BACKGROUND OF THE INVENTION

1. Field of the Invention

The present invention relates to a portable GPS signal receiving device used in leisure or sports activities. In particular, the present invention relates to a portable GPS velocity/distance meter performing a velocity measuring method of a moving object by utilizing a Doppler frequency of a carrier wave of GPS waves and a velocity measuring method for calculating a movement velocity from time information and a difference in positional information within obtained measured data by conducting measurement several times.

2. Description of the Related Art

A GPS system which is a satellite navigation system in which a continuous three-dimensional positional measurement is possible from any place on the earth and, at the same time, a velocity and an advancing orientation of a moving object may be obtained independently is applied to a car navigation system which has, recently, rapidly been used and accommodated. Also, in leisure or sports activities, a GPS signal receiving device is miniaturized so that it has been extensively used as a simplified portable positioning device.

For instance, Japanese Patent Application Laid-Open No. Hei 4-351981 discloses a conventional portable GPS signal receiving device. This portable GPS signal receiving device is a GPS signal receiving device with a GPS signal receiving function for calculating positional information including latitude, longitude and altitude at a current time and further calculating an orientation and a distance to represent them on a display device. This is characterized in that an electric power is provided by a solar battery provided on a cover of the signal receiving device body.

Also, Japanese Patent Application Laid-Open No. Hei 6-118156 discloses a portable GPS signal receiving device, in a palm-top size, which is composed of a signal receiving section for receiving a GPS signal from a GPS satellite, a positional information calculating section for calculating positional information for every predetermined period of time from the GPS signal during movement of the moving object, a memory section for storing positional information for every predetermined period of time, a movement situation calculation section for calculating a moving distance for every predetermined period of time and total movement distance on the basis of the positional information for every predetermined period of time stored in this memory section, and a display section for displaying the movement situation that is the information as a result of the calculation.

Furthermore, Japanese Patent Application Laid-Open No. Hei 9-145814 discloses a card size portable GPS signal receiving device, i.e., a so-called portable car navigation system signal receiving device, in which a liquid crystal display and various operation keys are provided on an outer surface of a card type case and a map memory card (ROM) is detachably inserted into the card type case. In the interior of the card type case, there are provided a patch type antenna for receiving a GPS signal from a GPS satellite, a GPS signal receiving section for obtaining positional data of the moving object by processing the received GPS signal, a calculation processing section for calculating the current position of the moving object on the bases of the obtained positional data and a display controlling section for superimposing the current position of the calculated moving object on the map read out from the map memory card to display it on the liquid crystal display screen.

variety of equipment used in leisure or a sports activities is generally required to be superior in portability and operability. Any conventional device described above would meet these requirements to some extent but it is hard to say that such a device satisfactorily meets the requirements. Therefore, a wristwatch type GPS signal receiving device that is particularly superior in portability has been demanded. For the wristwatch type device, it is impossible to realize a portable car navigation system signal receiving device provided with the map memory card as disclosed in Japanese Patent Application Laid-Open No. Hei 9-145814 due to the size of the map memory card. Accordingly, the compact portable GPS signal receiving device like the wristwatch type devise is basically used as the velocity/distance meter for displaying the time, velocity, distance or the like by numbers on the liquid crystal display section.

There are two methods for determining the movement distance from a point A to a point B and the movement velocity by utilizing the positional data from the GPS signal receiving device. First of all, there is a first method in which the latitude and the longitude of the points A and B are measured respectively, the distance between the points is taken as the movement distance, and this movement distance is divided by the known movement time to obtain the movement velocity. However, this method is only applicable to the basic case where the moving object moves linearly. In the case where the moving object does not move linearly, as described in Japanese Patent Application Laid-Open No. Hei 6-118156, it is necessary to conduct the measurement by dividing the path in a number of linear portions. In addition, the GPS service that is now available is a so-called SPS in which a C/A code and a navigation message are only used for positioning. Since the measurement width of the absolute position is in the range of 10 to 100 m in radius, the measurement accuracy is not very high. Accordingly, velocity measurement method for a moving object is done utilizing a method using the Doppler frequency of a carrier wave of the GPS waves. This is a velocity measurement method which utilizes the fact that the Doppler frequency is in proportion to the movement velocity if the carrier wave has a constant value. According to this measurement method, since the movement velocity of the moving object may be instantaneously measured by measuring the Doppler frequency, it is possible to apply this system to a meandering road or a circuit course of a track.

According to the portable GPS velocity/distance meter of the present invention, there is adopted a velocity measurement method for the moving object by utilizing the Doppler frequency of the carrier wave of the GPS waves or a velocity measurement method for conducting positional measurement a plurality of times and calculating the movement velocity from the time information and difference is positional information within the obtained positional data. Also, both the velocity measurement methods may be used in combination. However, a human being walks or runs while waving his arms back and forth toward and away from the advancing direction. In the static condition, since the velocity of the arms waving up and down is zero when the conversion from the swing-up to the swing-down of the arms and at maximum when the arms pass through the lowest point. During this period, the velocity is gradually changed. Accordingly, the sine curve is depicted if the lateral axis represents time. On the other hand, the velocity of the advancing direction of the body is not periodically changed but may be kept substantially constant relative to the time axis. Since the wristwatch type GPS velocity/distance meter is attached to the wrist, the velocity relative to the ground is a composition of the moving velocity of the body and the velocity of the swing-up and swing-down of the arm. Accordingly, the velocity measured by the wristwatch type GPS velocity/distance meter is the composition velocity and is not the movement velocity of the human being, i.e., a carrier. For this reason, in the portable GPS velocity/distance meter, since there is an effect of the swing-up and swing-down of the arm, there is a problem in that it is impossible to obtain a desired movement velocity for the intended purpose. Also, not only the waving up and down of the arm but also the periodical up-and-down movement of the body in walking or running would interfere with the desired movement velocity.

Also, in the portable GPS velocity/distance meter, and in particular, the wristwatch type GPS velocity/distance meter, due to the size of the overall device, it is inevitable to use a small-size battery. However, GPS signal receiving device consumes a rather large power during the operation. This is a very large load for the small-size battery.

Furthermore, in case of training of a marathon runner or training of a long-distance runner, a coach has to always understand the running condition or the like and to give a suitable instruction such as change in pitch or the like. In training for track, events it is possible to know the running condition of the runner on the basis of the lap time for every turn. However, in the training in a general road, it is not easy for the coach to follow the runner on a ride in an automotive vehicle or a bicycle. He could not know the running condition of the runner appropriately. Accordingly, it is necessary to realize a portable GPS velocity/distance meter by which it is possible to monitor, from a distant point, the data of the running conditions such as a running velocity, a running pitch, a lap time or the like of the long-distance runner during training, and to give the runner appropriate instructions at an appropriate timing.

SUMMARY OF THE INVENTION

A first object of the present invention is to provide a portable GPS velocity/distance meter utilizing a GPS signal to seek a suitable movement velocity of a carrier while removing an adverse effect of a periodic movement such as up-and-down movement of a body or up-and-down swing motion of an arm which occurs when the carrier walks or runs.

A second object of the present invention is to provide a portable GPS velocity/distance meter utilizing a GPS wave to reduce power consumption of the device to make it possible to prolong the use for an extended period of time.

A third object of the present invention is to provide a portable GPS velocity/distance meter by which not only the carrier but also a person at a remote position may know movement conditions such as movement velocity, distance or the like of the carrier.

A fourth object of the present invention is to provide a portable GPS velocity/distance meter utilizing a GPS signal to minimize an error in movement velocity and movement distance calculated, while suppressing the adverse affect of SA (selective availability).

In order to solve the first, second and fourth objects, according to the present invention, there is provided a portable GPS velocity/distance meter comprising: a GPS signal receiving section for receiving a signal from a GPS satellite and outputting positional data including movement velocity of a moving object; a microcomputer for performing various controls and calculations in accordance with a program; and input section for setting a condition of the various controls and calculations including the operational timing of the positional operation of the GPS signal receiving section in the microcomputer; and a display section for displaying movement velocity and movement distance of the carrier that is the moving object under the control of the microcomputer, and further comprising: a control means for controlling the GPS signal receiving section on the basis of the operational timing to intermittently perform the positional operation at predetermined intervals; and a velocity averaging means for averaging the movement velocity.

In order to solve the first, third and fourth objects, according to the present invention, there is provided a portable GPS velocity/distance meter comprising: a GPS signal receiving section for receiving a signal from a GPS satellite and outputting positional data including movement velocity of a moving object; a microcomputer for performing various controls and calculations in accordance with a program; and input section for setting a condition of the various controls and calculations including positional interval data of the GPS signal receiving section in the microcomputer; a display section for displaying movement velocity and movement distance of the carrier that is the moving object under the control of the microcomputer; and a transmit-receive section for connecting a remote supervising device and the microcomputer with each other in a wireless manner, and further comprising: a control means for controlling the GPS signal receiving section on the basis of the positional interval to intermittently perform the positional operation; and a velocity averaging means for averaging the movement velocity wherein the transmit-receive section further comprises a means for transmitting the data such as a velocity and a distance calculated by the microcomputer to the remote supervising device. The transmit-receive section further comprises a means for receiving a change command signal of various calculation control conditions from the remote supervising device and the microcomputer has a means for performing setting and changing the various calculation control conditions in accordance with the change command signal.

DETAILED DESCRIPTION OF THE PREFERRED EMBODIMENTS

In order to attain the first, third and fourth objects, the portable type one is of a wristwatch type to constitute a portable GPS velocity/distance meter.

Figure 1:
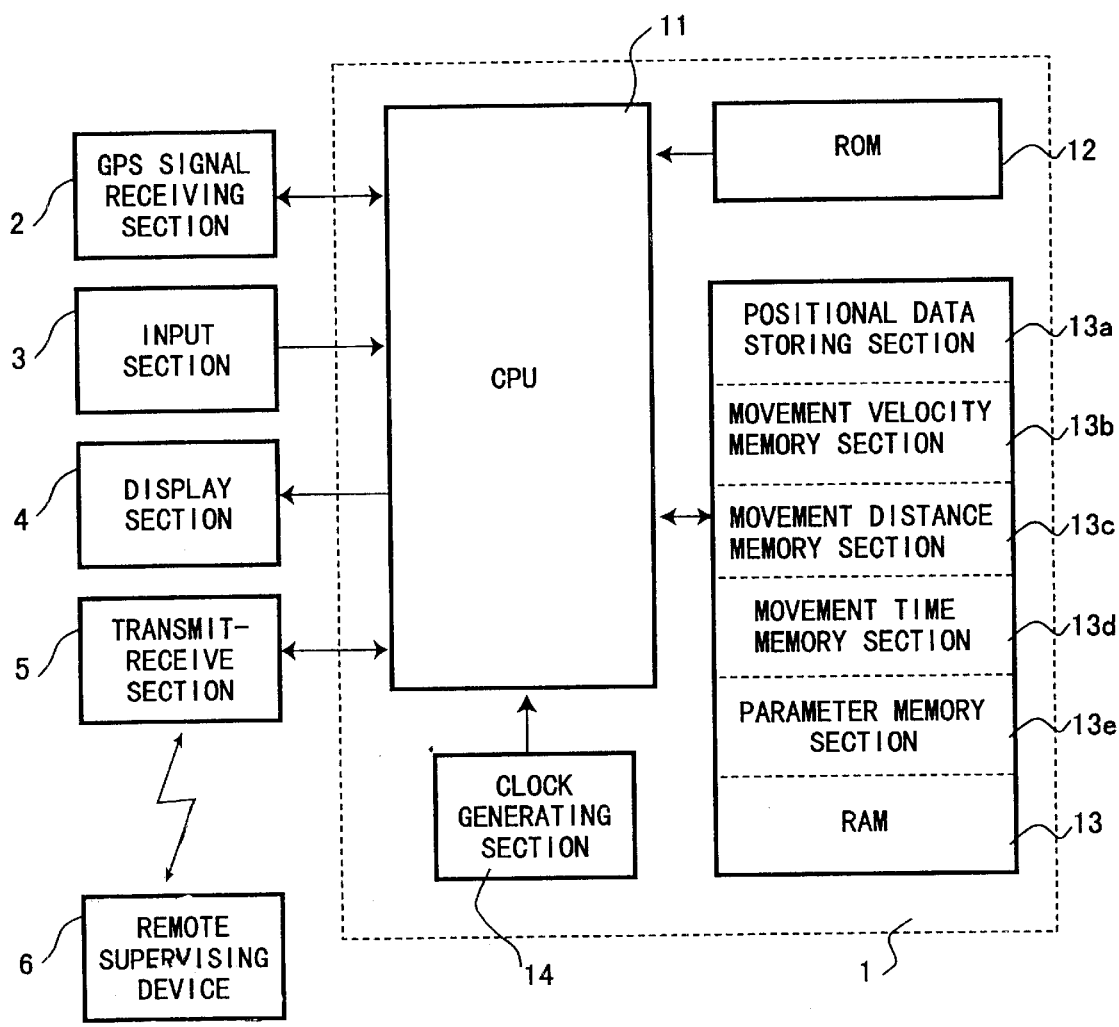
FIG. 1 is a block diagram showing a structure of a portable GPS velocity/distance meter in accordance with one embodiment.

In FIG. 1, a portable GPS velocity/distance meter according to the present invention is composed of a microcomputer 1 for conducting calculation and control of various equipment in accordance with a program, a GPS signal receiving section 2 for receiving a signal from a GPS satellite and outputting positional data including movement velocity of a moving object, and input section 3 for setting a variety of parameters or the like including an operational timing of a positional operation of the GPS receiving section 2 in the microcomputer 1, a display section 4 for displaying movement velocity, movement distance or the like calculated by the microcomputer 1, and a transmit-receive section 5.

The microcomputer 1 is composed of a micro processor (CPU) 11 for performing various calculation processes and controls of respective structural elements in accordance with a control program, a read-only-memory (ROM) 12 for storing the control program, a random-access-memory (RAM) 13 for storing various data or the like generated during the execution of the control program by the CPU 11, and a clock generating section 14 for generating an operational clock signal for the CPU 11. The RAM 13 includes a positional data memory section 13a, a movement velocity memory section 13b, a movement distance memory section 13c, a movement time memory section 13d and a parameter memory section 13e, etc.

The GPS signal receiving section 2 is composed of a signal receiving antenna 21 (FIG. 5) and a signal receiving circuit. The signal receiving circuit is composed of a band amplifying circuit for amplifying the GPS wave received by the antenna 12, a down converter circuit for converting the output frequency signal of the band amplifying circuit into an intermediate signal, an analog/digital converting circuit for converting into a digital signal the analog signal which is an output of the down converter circuit, and a message decoding circuit. By the way, in the GPS system which is available in general, the wave sent from the GPS satellite is PSK modulated in terms of a pseudo noise signal (navigation data such as a C/A code for identifying the satellite, orbital information of the satellite, time information or the like) and is a spectral diffused frequency signal of 1.57542 GHz. Accordingly, the message decoding circuit reverse diffuses the C/A code in an output of the analog/digital converting circuit and outputs digital navigation data. This output of the message decoding circuit, i.e., the digital navigation data which is the output of the GPS signal receiving section 2 is temporarily stored in the positional data memory section 13a of the RAM 13 of the microcomputer 1. Of course, the velocity data on the basis of the Doppler frequency is output from the message decoding circuit and is also temporarily stored in the positional data memory section 13a of the RAM 13 of the microcomputer 1.

Figure 5:
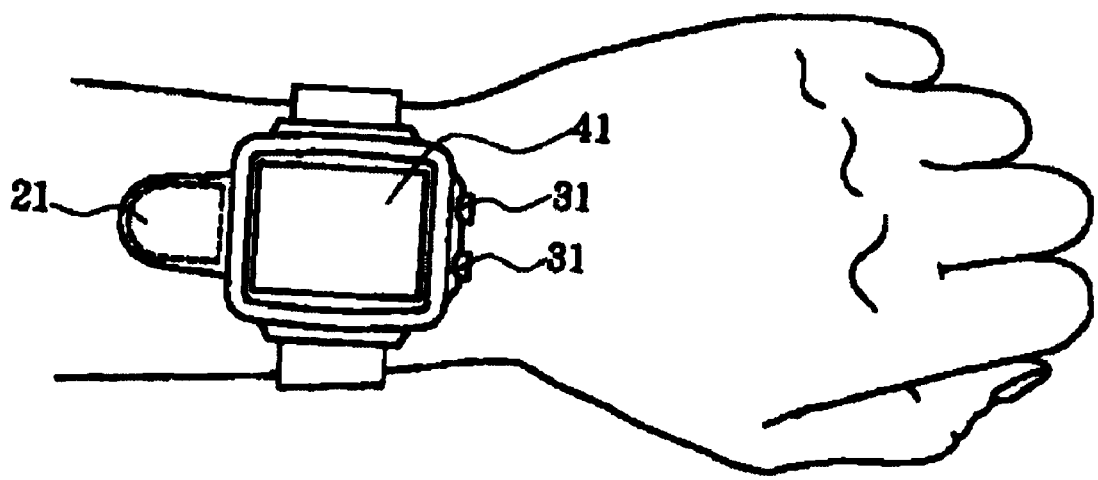
FIG. 5 is a perspective view of the portable GPS velocity/distance meter in accordance with one embodiment of the invention when the meter is used on the arm.

In the input section 3, it is possible to set the start input and the stop input for the portable GPS velocity/distance meter, and in addition, it is possible to set parameters for constant distance, constant time, destination distance and lap distance. The operation of switching a constant distance unit to a predetermined time unit may be performed by the input section 3. The switching operation of these factors is performed by operating push button switches 31 as shown in FIG. 5. Also, the display section 4 is controlled by the CPU 11 of the microcomputer 1 and a displays on liquid crystal panel 41 the movement velocity, movement distance, movement time or the like of the carrier wearing the device.

The signal receiving/sending section 5 is a wireless signal receiving section having a means for sending data such as movement velocity or movement distance calculated by the microcomputer 1 to a remote supervising device 6, and a means for receiving change command signals or the like of various calculation conditions from the remote supervising device 6 and inputting them into the microcomputer 1. The remote supervising device 6 includes at least a wireless signal receiving section and a display section and is a portable supervising device or an installed supervising device that may be utilized by a coach or the like to give an instruction or advice to the carrier as desired while supervising the condition of the carrier of the GPS velocity/distance meter from a remote position.

Figure 2:
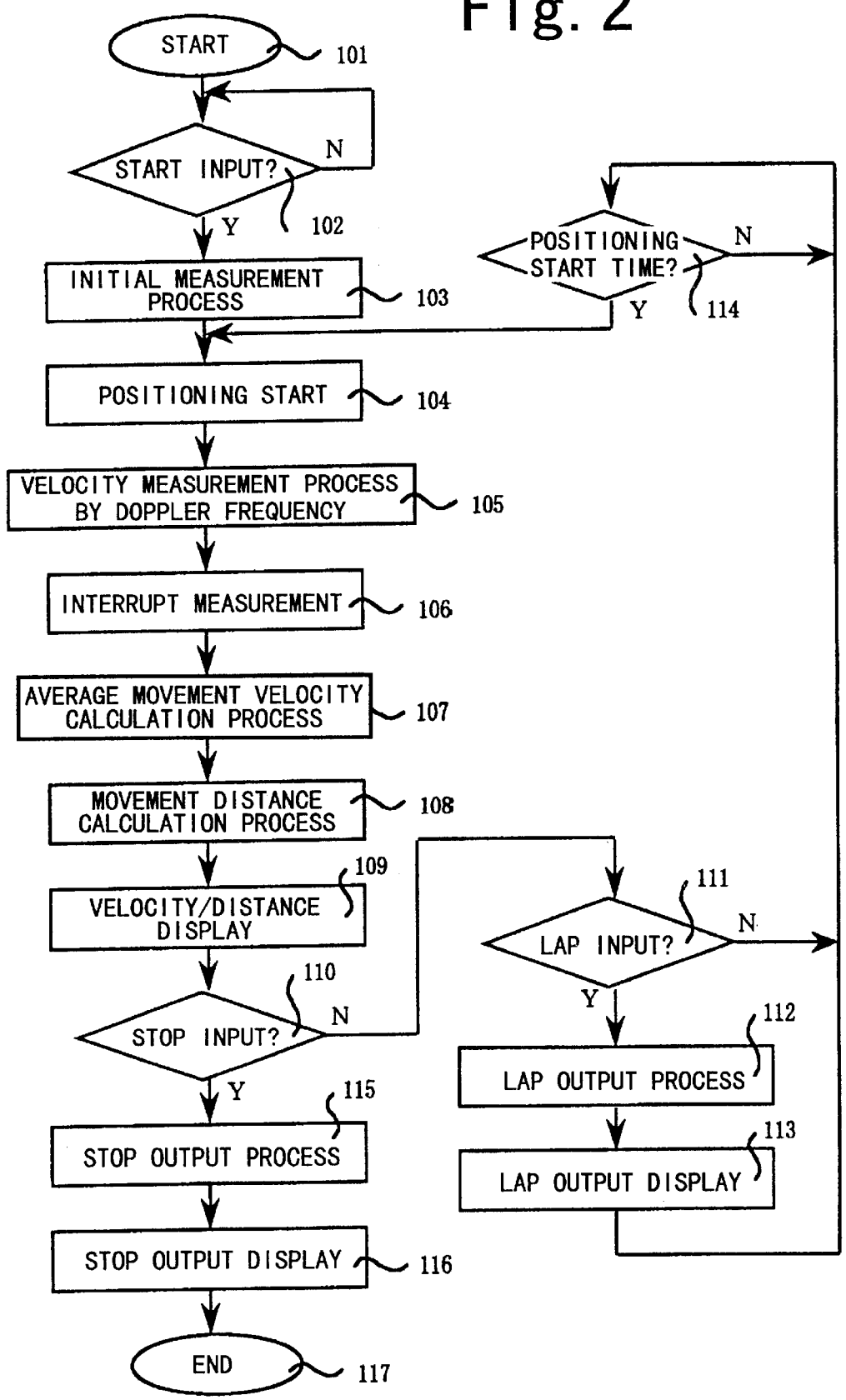
FIG. 2 is a flowchart showing an example of an operation of the portable GPS velocity/distance meter.

The operation of the invention will now be described with reference to FIG. 2. The carrier starts the portable GPS velocity/distance meter by operating the button switches 31 (101). Then, the CPU 11 judges whether or not the start input is detected (102). If the start input is detected, an initial measurement process including an operation of initializing the time data and movement distance data (103). When the initial measurement process is performed, the CPU 11 controls the GPS signal receiving section 2 to start the positioning operation (104). The GPS signal receiving section 2 measures the Doppler frequency of the carrier frequency and outputs the three-dimensional velocity vector signal of the carrier to the microcomputer 1 (105). The CPU 11 vertically compensates for the three-dimensional velocity vector, calculates the velocity in the advancing direction of the carrier, and stores the velocity data, i.e., the instantaneous movement velocity data at the time of measurement in the positioning data memory section 13a of the RAM 13 (105). When the velocity measurement process (105) by the Doppler frequency has been completed, the CPU 11 controls the GPS signal receiving section 2 to interrupt the measurement operation (106).

Subsequently, the CPU 11 reads out a plurality (for example, four) of contiguous current instantaneous movement velocity data, seeks an average movement velocity of the carrier by performing the movement average calculation and stores the average movement velocity data in the movement velocity memory section 13b (107). Subsequently, the CPU 11 calculates the accumulated movement distance until the present position from the start, and stores this accumulated movement distance data in the movement distance memory section 13c (108). The accumulated movement distance is obtained by seeking the product of the positional time interval and the average movement velocity for every measurement, i.e., the movement distance for every measurement interval and accumulating this from the start until the present position. Subsequently, the CPU 11 reads out the accumulated movement distance data from movement distance memory section 13c and the average movement velocity data from the movement velocity memory section 13b of the RAM 13, respectively, and controls the display section 4 to display the average movement velocity and the accumulated movement distance of the carrier (109).

Subsequently, the CPU 11 judges whether or not a stop input is present (110). When a stop input is detected, the CPU 11 conducts the stop process to store stop output data in the movement distance memory section 13c and the movement time memory section 13d and the RAM 13 (115). Thereafter, the CPU 11 reads out the stop output data from the RAM 13, controls the display section 4 to display the stop output data (116) and completes the measurement of the velocity and distance (117). If the stop input is based upon the distance, the stop output process outputs the time, and therefore the stop output data becomes the destination time in the case where the desired information is based on the time at a predetermined distance. If the stop input is based upon the time, the stop output process outputs the distance. Accordingly, if the information is based upon the distance within a constant time period, the stop output is based upon the destination distance or the accumulated distance. The stop input is set in the microcomputer 1 before the completion of the measurement of the velocity and distance by the carrier's operation the input section 3. Of course, there is another stop input mode for the carrier to forcibly input the data at a midway point.

When a stop input is not detected, the CPU 11 judges whether or not a lap input is present (111). When a lap input is detected, the CPU 11 conducts a lap process to store lap output data in the movement distance memory section 13c or the movement time memory section 13d of the RAM 13 (112). Thereafter, the CPU 11 reads out the lap output data from the RAM 13, and controls the display section 4 to display the lap output data (113). If the lap input is the distance, the lap outputs the time, whereas if the lap input is the time, the lap output outputs the distance. The lap input is set in the microcomputer 1 before the completion of the measurement of the velocity and distance by the carrier's operation of the input section 3. Of course, there is a lap mode for the carrier to forcibly input the data at any time.

When the lap input is not detected, the CPU 11 judges whether or not it reaches the positioning start time, i.e., whether or not the predetermined interval has lapsed from the closest positioning time (114). When it is the positioning start time, the CPU 11 controls the GPS signal receiving section 2 to start the positioning operation (104). Thereafter, a series of operations in accordance with the flowchart will be repeated until the stop input is detected.

Figure 3:
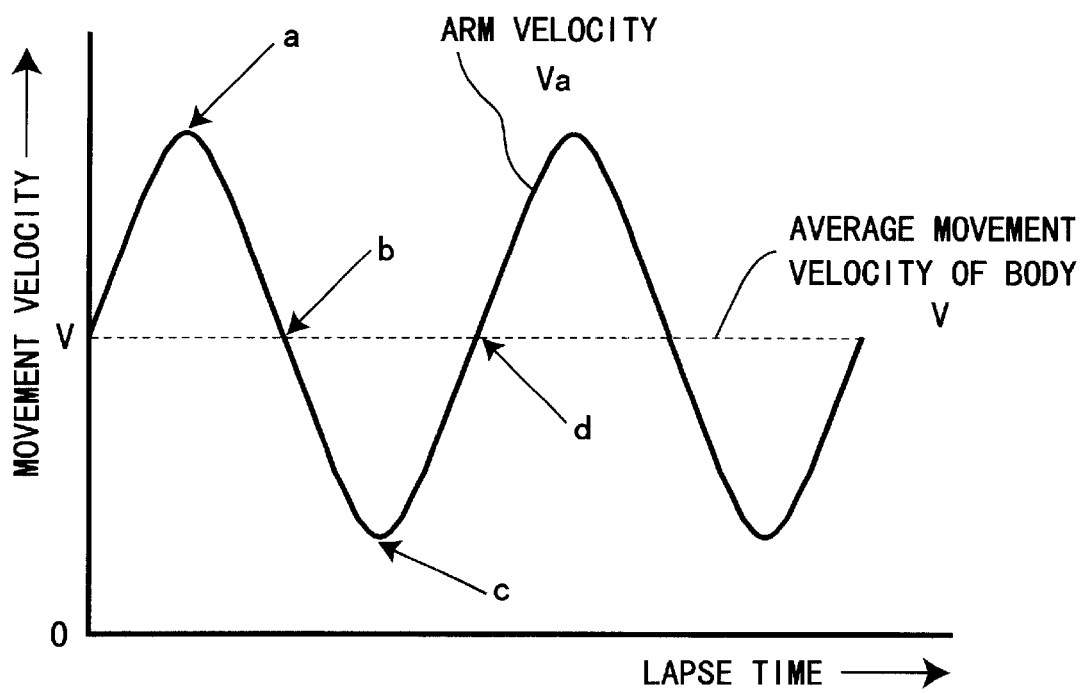
FIG. 3 is an illustration of how an affect of arm swing appears in the case where the portable GPS velocity/distance meter is mounted around the arm.
Figure 4:
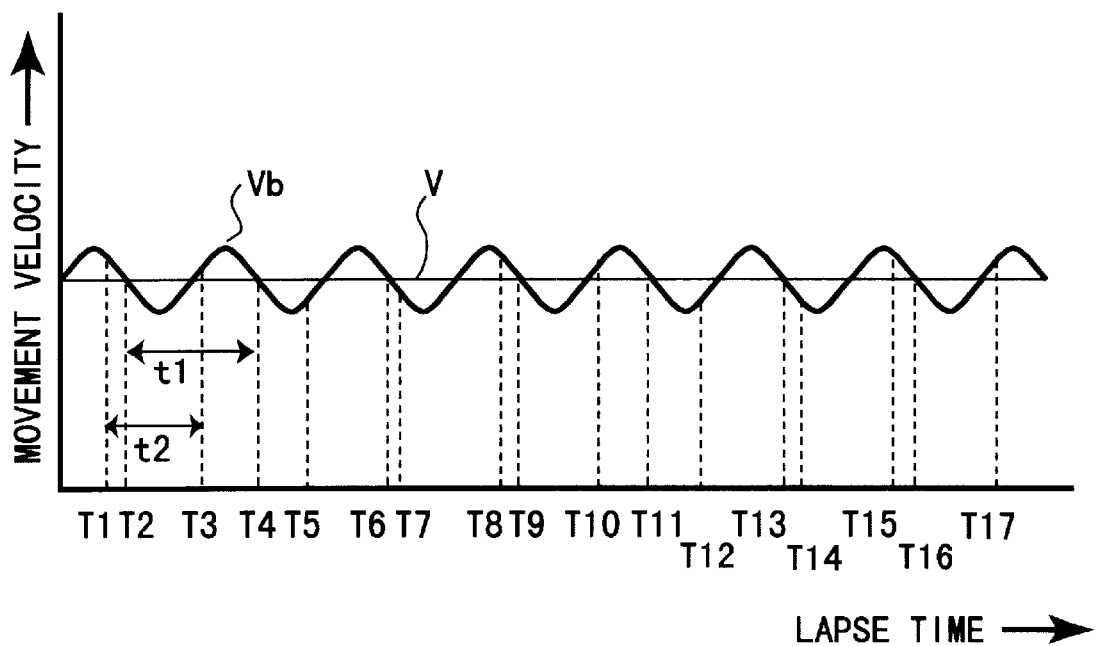
FIG. 4 is view of illustrating how the measurement timing and measurement interval of the movement velocity of the carrier is affected in the portable GPS velocity/distance meter.

By the way, as described above, it is one of the features of the present invention that, in the case where the portables GPS velocity/distance meter is used while being mounted on the arm, the adverse effect of the swing-up and swing-down of the arm is removed and the movement velocity of the carrier in conformity with the desired object is obtained. In order to realize this, in the microcomputer 1, there is provided a velocity averaging means for reading out a plurality (for example, four) of the latest data out of the instantaneous movement velocity data measured intermittently at a predetermined positioning interval and accumulated in the positional data memory section 13a and averaging these data to seek the average movement velocity of the carrier. This will be further described with reference to FIGS. 3 and 4. The points where the effect of the arm swing does not occur are points b and d where a sine wave curve of the velocity component Va of the arm intersects with a straight line representative of the average velocity V of the body in FIG. 3. Inversely, the points where the arm swing effect occurs mostly are points a and c. Therefore, if the instantaneous movement velocity is measured at times T2, T4, T6, T9, T11, T13 and T16, the effect of the arm swing does not occur. However, this is actually impossible. This is because the velocity of the arm swing variously is variously changed depending upon the manner of the carrier's movement. Incidentally, t1 represents a time interval of measurement.

Actually, the time interval t2 of measurement is set up depending upon the carrier. This time interval or a multiplicity of times of the time interval is set up as the measurement interval in the microcomputer 1 by the input section 3. Then, in FIG. 4, the instantaneous movement velocity is measured at the time T1, T3, T5, T7, T8, T10, T12, T14, T15 and T17. Otherwise, in the case where the time interval of the multiplicity of times of t2 is set as the measurement interval, the measurement of the instantaneous movement velocity is measured at the next time, corresponding to the time interval t2. As is apparent from FIG. 4, the average of the instantaneous movement velocity at the time T1, T3, T5 and T7 is substantially equal to the average velocity V. Also, the average of the instantaneous movement velocity at the time T3, T5, T7 and T8 is substantially equal to the average velocity V. The same is applied to the following cases.

According to the present invention, the instantaneous movement velocity of the carrier is detected as three-dimensional velocity components, i.e., an E component (east-west direction component), an N component (north-south direction component) and an altitude component by measuring the Doppler frequency of the GPS wave. Therefore, velocity averaging means for composing the E component and N component individually, and composing the respective average components to seek the average movement velocity of the carrier may be provided in the microcomputer 1. Also, velocity averaging means for dividing the velocity into components in the advancing direction and the straight direction, respectively, and averaging them independently to seek the average movement velocity of the carrier may be provided in the microcomputer 1.

Figure 6:
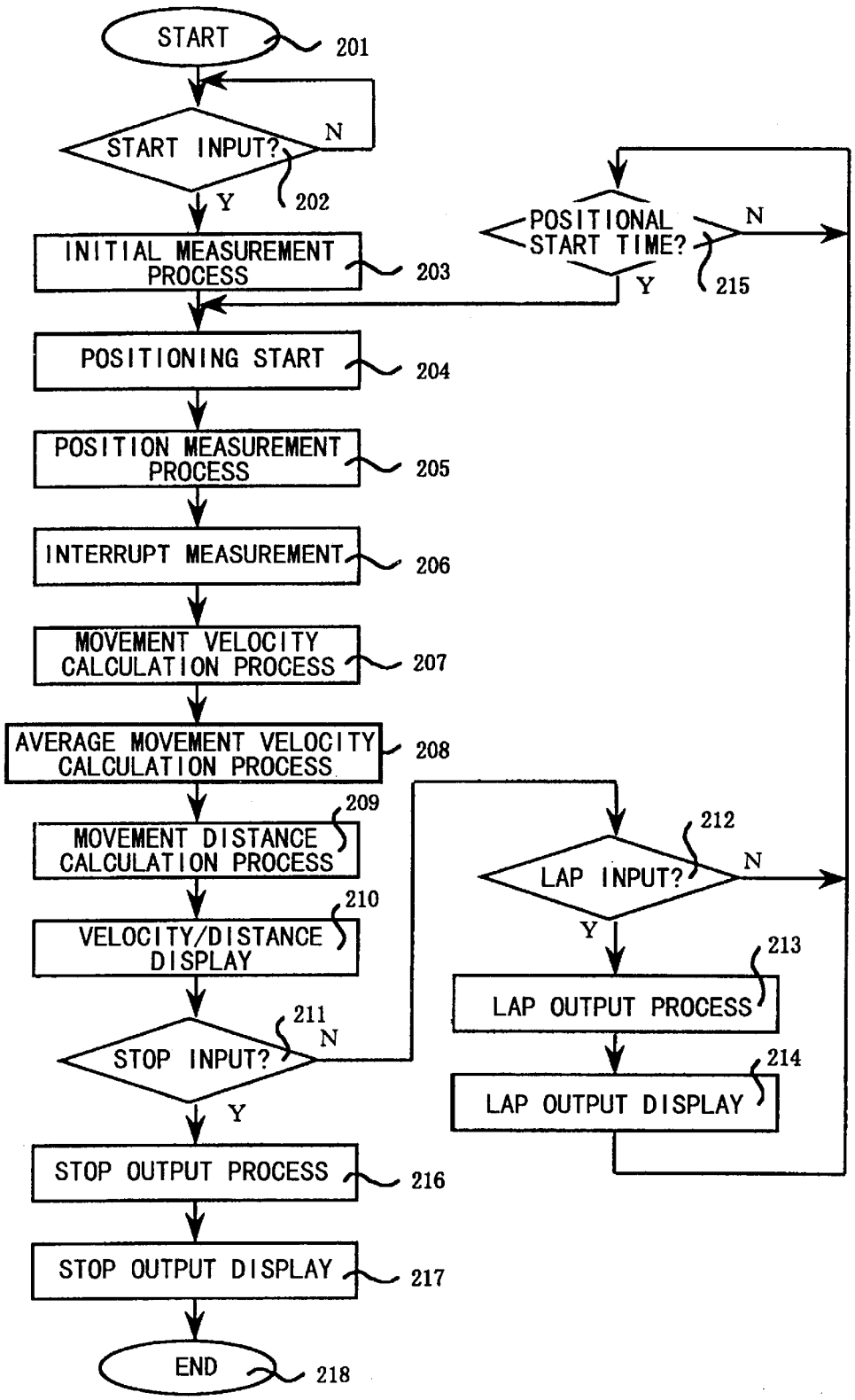
FIG. 6 is a flowchart of a velocity measurement method of the moving object for calculation from the difference in positional information within the positional data obtained in a plurality of positional measurements and time information.

The operation of the velocity measurement method of the moving object for performing the calculation on the basis of the of the time information and the difference in the positional information of the positional data obtained at a plurality of positioning measurements according to the present invention will now be described with reference to FIG. 6. The carrier operates the button switches 31 to start the portable GPS velocity/distance meter (201). Then, the CPU 11 judges whether or not the start input is detected (202). If the start input is detected, the CPU 11 performs an initial measurement process including the initialization of the time data and movement distance data (203). When the initial measurement process is completed, the CPU 1 control the GPS signal receiving section 2 to start the positioning operation (204). The GPS signal receiving section decodes the signal of the GPS wave, calculates the three-dimensional position of the carrier from the relative distance to the satellite, and outputs the positional time signal and the three-dimensional signal to the microcomputer 1 (205). The CPU 11 calculates and obtains the time and the position of the carrier from the three-dimensional signal and accumulates the positional data and the time data in the measurement data memory section 13a of the RAM 13 (205). When the positional measurement process (205) is completed, the CPU 11 controls the GPS signal receiving section 2 to interrupt the positional operation (206).

Subsequently, the CPU reads out two current continuous positional data and time data from the positional data entries memory section 13a of the RAM 13, and calculates the movement velocity from the difference of the positional data and the difference from the time data and accumulates them in the movement velocity section 13b (207). Furthermore, the CPU 11 reads out a plurality (for example, four) of the latest continuous movement velocities from the movement velocity section 13b, performs the movement average calculation to seek the average velocity of the carrier and accumulates this average movement velocity data in the movement velocity memory section 13b (208). Subsequently, the CPU 11 calculates the accumulated movement distance from the start until the present position and stores the accumulated movement distance data in the movement distance memory section 13c (209). The accumulated movement distance is one obtained by seeking the product of the positional time interval and the average velocity for every positioning, i.e., the movement distance for every positional interval and accumulates this from the start until the present position. Subsequently, the CPU 11 reads out the average movement velocity data from the movement velocity memory section 13b of the RAM 13 and the accumulated movement distance data from the movement distance memory section 13c, respectively and controls the display section 4 to display the average movement velocity and the accumulated movement of the carrier (210).

Subsequently, the CPU 11 judges whether or not the stop input is present (211). When the stop input is detected, the CPU 11 performs the stop process to accumulate the stop output in the movement distance memory section 13c or the movement time memory section 13d of the RAM 13 (216). Thereafter, the CPU 11 reads out the stop output from the RAM 13, controls the display section 4 to display the stop (217) and completes the measurement of the velocity and the distance (218). If the stop input is based upon the distance, the strop output is based upon the time. Accordingly, in the case where the desired information is based upon the time at the constant distance, the stop output means the destination time. If the stop input is based upon the time, the stop output outputs the distance. Accordingly, in the case where the desired information is based upon the distance within a constant time, the stop output means the accumulated distance or the destination distance. The stop input is set up the microcomputer 1 by the carrier's operation of the input section 3 before the measurement of the velocity and distance. Of course, there is a stop input mode for the carrier to forcibly input the data at any time When the stop input is not detected, the CPU 11 judges whether or not the lap input is present (212). When the lap input is detected, the CPU 11 conducts the lap process to store the lap output in the movement distance memory section 13c or the movement time memory section 13d of the RAM 13 (213). Thereafter, the CPU 11 reads out the lap output from the RAM 13, and controls the display section 4 to display the lap output (214). If the lap input is the distance, the lap output outputs the time, whereas if the lap input is the time, the lap output outputs the distance. The lap input is set in the microcomputer 1 before the completion of the measurement of the velocity and distance by the carrier's operation of the input section 3. Of course, there is a lap mode for the carrier to forcibly input the data at any time.

When the lap input is not detected, the CPU 11 judges whether or not it reaches the positioning start time, i.e., whether or not the predetermined interval has lapsed from the closest positioning time (215). When it is the positioning start time, the CPU 11 controls the GPS signal receiving section 2 to start the positioning operation (204). Thereafter, a series of operations in accordance with the flowchart will be repeated until the stop input is detected.

According to the present invention, the averaging operation of the velocity is performed for every constant time period or at every constant distance. In the case where the averaging operation is impossible, for example, in the case the averaging operation is set at a period of ten seconds, the non-averaged raw data is displayed when it has not yet lapsed for ten seconds and also it is displayed that this is the raw data. In a place where the wave does not reach such as a tunnel, since it is impossible to receive the GPS, in this case, the average movement velocity immediately before the current situation is displayed and this is assumed as the calculated velocity of the accumulated movement distance. In calculating the accumulated movement distance, for example, the measurement for five minutes or longer is performed, and the average movement velocity and the accumulated movement distance are obtained from a number of positional data so that the affect of the arm swings, or SA may be suppressed considerably.

According to the present invention, in order to reduce power consumption for the device, the GPS signal receiving section 2 which has a large consumption of electric power is caused to perform the measurement operation intermittently at a constant measurement interval. Although the positional measurement interval is set in the microcomputer 1 by operating the input section 3, the magnitude is an appropriate value taken from the carrier's movement velocity, i.e., about several seconds. If the variation in average movement velocity is small, the positional measurement interval is set to be greater than the set value so that the power consumption may be further reduced. This may be realized by providing means for supervising the variation in average movement velocity in the microcomputer 1, and means for changing the positional measurement interval data stored in the parameter memory section 13e in the case where the variation range of the average movement velocity is within the set range for a predetermined time period.

According to the present invention, in the portable GPS velocity/distance meter using the velocity measurement method of the moving object by utilizing the Doppler frequency of the carrier wave of the GPS waves, the instantaneous movement velocity at every measurement time point is averaged for the predetermined interval corresponding to the use object to be displayed on the display section. Accordingly, the adverse affect of the periodic movement such as the arm swing-up and swing-down movement or the up-and-down movement of the body caused when the carrier walks or runs is removed from the displayed movement velocity, and a stable readable value, i.e., suitable movement velocity that is not the value of time may be obtained. Furthermore, the adverse affect of SA is considerably reduced and the precision in movement velocity and distance is enhanced. In brief, the portable GPS velocity/distance meter may be realized in which the movement velocity suitable to the use object may be displayed on the display section. Also, since the positional measurement operation of the GPS signal receiving section is controlled to be performed at the predetermined interval in an intermittent manner, the power consumption of the device is suppressed and the device may be used for a long period time. Furthermore, since the device is provided with the wireless signal receiving portion, it is possible, of course, for the carrier and a person located at a remote position to know the movement condition such as the movement velocity and distance of the carrier and it is possible to change the condition of control and the calculation of the microcomputer from the remote position. The present invention may be applied not only to the velocity measurement method of the moving object utilizing the Doppler frequency of the carrier wave of the GPS waves but also to the portable GPS velocity/distance meter using the velocity measurement method of the moving object by performing the calculation from the difference of the time information within the positional data obtained by the plurality of measurements and the time information. Also, the present invention is not limited to a walker or a runner or the like but may be applied to a race animal such as a horse, a moving object like an automotive vehicle or a bicycle. Also, the present invention is advantageous in that the adverse affect of the vibration or SA may be depressed.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A portable GPS velocity/distance meter comprising: a GPS signal receiving section for receiving a GPS signal from a GPS satellite and outputting positional data including movement velocity data of a carrier of the GPS signal receiving section; a microcomputer having a memory section for controlling the GPS signal receiving section and conducting calculations based on the positional data output by the GPS receiving section in accordance with a stored program; an input section connected to the microcomputer for setting measurement conditions including a predetermined time interval between consecutive GPS signal receiving operations of the GPS signal receiving section; and a display for displaying at least one of a movement velocity and a movement distance of the carrier of the GPS signal receiving section under control of the microcomputer; wherein the microcomputer includes control means for controlling the GPS signal receiving section to intermittently receive the GPS signal and output the positional data at the predetermined time intervals and velocity averaging means for obtaining an average movement velocity of the carrier by averaging consecutive movement velocity data values.

2. A portable GPS velocity/distance meter comprising: a GPS signal receiving section for receiving a GPS signal from a GPS satellite and outputting positional data including movement velocity data of a carrier of the GPS signal receiving section; a microcomputer having a memory section for controlling the GPS signal receiving section and conducting calculations in accordance with a stored program; an input section connected to the microcomputer for setting measurement conditions including a predetermined time interval between consecutive GPS signal receiving operations of the GPS signal receiving section; and a display for displaying at least one of a movement velocity and a movement distance of the carrier of the GPS signal receiving section under control of the microcomputer; and a transmit-receive section for connecting a remote supervising device and the microcomputer with each other in a wireless manner; wherein the microcomputer includes control means for controlling the GPS signal receiving section to intermittently receive the GPS signal and output the positional data at the predetermined time intervals and velocity averaging means for obtaining an average movement velocity of the carrier by averaging consecutive movement velocity data values; and the transmit-receive section includes means for transmitting data including at least one of a velocity and a movement distance of the carrier as calculated by the microcomputer to the remote supervising device.

3. A portable GPS velocity/distance meter according to claim 2; wherein the transmit-receive section further comprises means for receiving a change command signal for changing calculation control conditions from the remote supervising device; and the microcomputer includes means for changing calculation control conditions in accordance with the change command signal.

4. A portable GPS velocity/distance meter according to claim 1; where the GPS receiving section, the microcomputer, the input section and the display are accommodated in a housing configured in the form of a wristwatch.

5. A portable GPS velocity/distance meter according to claim 2; wherein the GPS receiving section, the microcomputer, the input section, the display and the transmit-receive section are accommodated in a housing configured in the form of a wristwatch.

6. A portable GPS velocity/distance meter according to claim 1; wherein the microcomputer comprises a microprocessor for performing calculations and outputting control signals in accordance with the stored program, a read-only memory for storing the program, a random-access memory for storing data generated by the microprocessor during execution of the stored program and a clock generating section for generating an operational clock signal for driving the microprocessor.

7. A portable GPS velocity/distance meter according to claim 6; wherein the random-access memory includes a positional data memory section for storing the positional data including the velocity data output by the GPS receiving section, a movement velocity memory section for storing velocity data calculated by the microprocessor, a movement distance memory section for storing movement distance data values calculated by the microprocessor, a movement time memory section for storing elapsed movement time and a parameter memory section for storing parameters set by the input section or calculated by the microprocessor.

8. A portable GPS velocity/distance meter according to claim 1; wherein the GPS signal receiving section comprises a signal receiving antenna and a signal receiving circuit.

9. A portable GPS velocity/distance meter according to claim 8; wherein the signal receiving circuit comprises a band amplifying circuit for amplifying the GPS signal received by the antenna, a downconverter for converting an output signal of the band amplifying circuit into an intermediate signal, an analog/digital converting circuit for converting an analog signal output by the downconverter into a digital signal, and a message decoding circuit for decoding a message contained in the GPS signal.

10. A portable GPS velocity/distance meter according to claim 9; wherein the GPS signal receiving section has means for receiving a spectral diffused frequency PSK modulated GPS signal in terms of a pseudo noise signal having navigation data including a C/A code for identifying the satellite, satellite orbital information and time information.

11. A portable GPS velocity/distance meter according to claim 10; wherein the message decoding circuit reverse diffuses the C/A code contained in an output of the analog/digital converting circuit and outputs digital navigation data.

12. A portable GPS velocity/distance meter according to claim 11; wherein digital navigation data output by the message decoding circuit is temporarily stored in the memory section and velocity data determined on the basis of a Doppler frequency of the GPS signal is output from the message decoding circuit and temporarily stored in the memory section.

13. A portable GPS velocity/distance meter according to claim 1; wherein the input section includes means for setting a start input and a stop input command for the portable GPS velocity/distance meter, and for setting parameters including constant distance, constant time, destination distance and lap distance.

14. A portable GPS velocity/distance meter according to claim 13; wherein the input section further includes means for converting a constant distance unit to a predetermined time unit.

15. A portable GPS velocity/distance meter according to claim 1; wherein the microcomputer includes means for varying the predetermined time interval set by the input section based on an average velocity of the carrier.

16. A portable GPS velocity/distance meter comprising: a GPS signal receiving section for receiving a GPS signal from a GPS satellite and outputting positional data including movement velocity of a carrier of the GPS signal receiving section; a microcomputer having a memory section for controlling the GPS signal receiving section and calculating an average movement velocity of the carrier throughout a given movement distance or movement time by averaging a predetermined number of contiguous movement velocity data values output by the GPS signal receiving section; and a display for displaying movement velocity and movement distance of the carrier under control of the microcomputer.

17. A portable GPS velocity/distance meter according to claim 16; wherein the microcomputer includes means for controlling the GPS receiving section to receive the GPS signal intermittently at predetermined time intervals.

18. A portable GPS velocity/distance meter according to claim 17; further comprising an input section connected to the microcomputer for setting measurement conditions including the predetermined time intervals between consecutive GPS signal receiving operations of the GPS signal receiving section.

19. A portable GPS velocity/distance meter according to claim 18; wherein the microcomputer includes means for setting the predetermined time intervals based on an average velocity of the carrier.

20. A portable GPS velocity/distance meter according to claim 16; further comprising a transmit-receive section for connecting a remote supervising device and the microcomputer with each other in a wireless manner and transmitting data including at least one of the velocity of the carrier and a movement distance of the carrier as calculated by the microcomputer to the remote supervising device.

* * * * *